(12) United States Patent
Vontell

(10) Patent No.: US 9,133,714 B2
(45) Date of Patent: Sep. 15, 2015

(54) TITANIUM FOIL AS A STRUCTURAL HEATER ELEMENT

(75) Inventor: John H. Vontell, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 2454 days.

(21) Appl. No.: 11/591,327

(22) Filed: Nov. 1, 2006

(65) Prior Publication Data
US 2008/0149619 A1 Jun. 26, 2008

(51) Int. Cl.
| H05B 3/68 | (2006.01) |
| H05B 3/06 | (2006.01) |
| F01D 5/18 | (2006.01) |
| F01D 5/14 | (2006.01) |
| F01D 25/02 | (2006.01) |
| F02C 7/047 | (2006.01) |

(52) U.S. Cl.
CPC *F01D 5/18* (2013.01); *F01D 5/147* (2013.01); *F01D 25/02* (2013.01); *F02C 7/047* (2013.01); *F05D 2300/133* (2013.01); *Y02T 50/672* (2013.01); *Y02T 50/676* (2013.01)

(58) Field of Classification Search
CPC ........... F01D 25/02; F01D 5/147; F01D 5/18; F02C 7/047; F05D 2300/133; Y02T 50/672; Y02T 50/676
USPC ...................... 219/201–205, 444.1, 542–549; 134/26–29
See application file for complete search history.

(56) References Cited

U.S. PATENT DOCUMENTS

| 2,992,317 A * | 7/1961 | Hoffman ........................ 219/202 |
| 3,988,254 A | 10/1976 | Mori |
| 4,029,479 A | 6/1977 | Parker |
| 4,489,123 A | 12/1984 | Schijve et al. |
| 4,624,752 A * | 11/1986 | Arrowsmith et al. ......... 205/148 |
| 5,074,972 A | 12/1991 | Matz |
| 5,849,110 A | 12/1998 | Blohowiak et al. |
| 5,866,272 A | 2/1999 | Westre et al. |
| 5,869,141 A * | 2/1999 | Blohowiak et al. ........... 427/309 |
| 5,925,275 A * | 7/1999 | Lawson et al. ................ 219/543 |
| 6,037,060 A | 3/2000 | Blohowiak et al. |
| 6,870,139 B2 | 3/2005 | Petrenko |
| 7,034,257 B2 * | 4/2006 | Petrenko ....................... 219/482 |
| 2003/0211330 A1 | 11/2003 | Anderson et al. |

FOREIGN PATENT DOCUMENTS

| EP | 1447461 | 8/2004 |
| EP | 1459845 | 9/2004 |
| EP | 1593595 | 11/2005 |
| EP | 1762714 | 3/2007 |
| EP | 1820943 | 8/2007 |

OTHER PUBLICATIONS

P. Molitor, V. Barron, T. Young; Surface Treatment of Titanium for Adhesive Bonding to Polymer Composites: a Review; International Journal of Adhesion & Adhesives; Jan. 1, 2001; pp. 129-136; vol. 21, No. 2.
European Search Report; Mar. 16, 2010; 9 pages.

\* cited by examiner

*Primary Examiner* — Sang Y Paik
(74) *Attorney, Agent, or Firm* — Kinney & Lange, P.A.

(57) ABSTRACT

An electrothermal heater assembly, configured to be embedded inside a component for anti-icing and/or deicing the component, includes a titanium foil configured for use as a heating element, at least one reinforcement layer adjacent the titanium foil, and an adhesive configured to bond the titanium foil to the at least one reinforcement layer. The heater assembly is configured such that the titanium foil carries a structural load within the heater assembly.

25 Claims, 3 Drawing Sheets

TITANIUM FOIL AS A STRUCTURAL HEATER ELEMENT

STATEMENT OF GOVERNMENT INTEREST

This invention was made with Government support under contract number N00019-02-C-3003, awarded by the U.S. Navy. The U.S. Government has certain rights in this invention.

CROSS-REFERENCE TO RELATED APPLICATION

The following application is filed on the same date as the following co-pending application: SURFACE TREATMENT FOR A THIN TITANIUM FOIL by inventors John H. Vontell, Charles R. Watson, and Joseph J. Parkos, Jr. (U.S. Ser. No. 11/591,626, filed Nov. 1, 2006), which is incorporated herein by reference.

BACKGROUND OF THE INVENTION

The present invention relates to a titanium foil configured for use as a heater element. More particularly, the present invention relates to a titanium foil configured as a structural heater element within a composite.

It is desirable to minimize or prevent the formation of ice on certain components of a gas turbine engine in order to avoid problems attributable to ice accumulation. There are many existing methods of removing or preventing the formation of ice on gas turbine engine components and airframe components. Among these methods is the incorporation (or embedding) of an electrothermal heating element into a gas turbine engine or airframe component that is susceptible to ice formation. The heating element may also be applied to a surface of the component. The heating element heats the susceptible areas of the component in order to prevent ice from forming.

The heating element may be a metallic heating element which typically converts electrical energy into heat energy. The metallic heating element is typically a part of a heater assembly that also includes at least one layer that electrically insulates the heating element. For example, the heater assembly may be formed of a metallic heating element embedded into a fiber-reinforced composite structure.

In many applications in which the heater assembly is embedded inside the engine or airframe component, it may be desirable to minimize the amount of space that the heater assembly occupies. Moreover, it may be important that the heater assembly is able to carry a high structural load within the component.

Thin metal foils may work well as the metallic heating element. However, it may be difficult to design a composite structure in which the foil is not a sacrificial part within the component and is able to carry/transfer a structural load. Moreover, it may be difficult to achieve a durable and stable bond between the thin foil and the surrounding layers of the heater assembly so that the foil is able to transfer load within the component.

There is a need for a thin metal foil configured for use as a metallic heater element within a heater assembly, such that, when the heater assembly is embedded inside an engine or airframe component the metal foil is able to carry a structural load within the component.

BRIEF SUMMARY OF THE INVENTION

The present invention relates to an electrothermal heater assembly configured to be embedded inside a component for anti-icing and/or deicing the component. The heater assembly includes a titanium foil configured for use as a heating element, at least one reinforcement layer adjacent the titanium foil, and an adhesive configured to bond the titanium foil to the at least one reinforcement layer. The heater assembly is configured such that the titanium foil carries a structural load within the heater assembly.

DETAILED DESCRIPTION

The present invention relates to a heater assembly configured to be embedded inside an engine or aircraft component. The heater assembly includes a thin titanium foil configured as a metallic heating element and capable of carrying a structural load within the heater assembly. The heater assembly may be a composite structure formed from fabric layers that surround the titanium foil. The fabric layers commonly include at least one non-conductive layer that electrically isolates the titanium foil.

The heater assembly may be embedded inside any component that is susceptible to ice formation. For example, the component may be an aircraft component or a gas turbine engine component such as, but not limited to, a vane, an airfoil leading edge, a front bearing of the engine, a structural strut that supports the front bearing, and a duct. The component may be formed of materials such as, but not limited to, polymer matrix composites (PMC) (which may be reinforced with polymeric, glass, carbon or ceramic fibers), metal matrix composites, metal, ceramic matrix composites (CMC), and carbon/carbon composites.

When the heater assembly is embedded in the component, the heater assembly replaces some structural elements of the component in order to maintain the dimensions of the component. In those cases, the heater assembly, including the metallic heating element (i.e. the titanium foil), accounts for a percentage of the component. This may affect the strength and the structural characteristics, such as the transfer of structural loads, of the component. In order for the heater assembly to be able to carry a high structural load, the present invention incorporates a thin titanium foil into the heater assembly that functions as a heater, but is also able to carry/transfer a structural load within the heater assembly.

Figure 1:
FIG. 1 is a schematic of a film assembly, which includes a thin titanium foil surrounded by first and second film adhesives.

FIG. 1 is a schematic of film assembly 10, which includes titanium foil 12, first film adhesive 14 and second film adhesive 16. Titanium foil 12 is designed as a metallic heating element, which converts electrical energy into thermal heat, as is known in the art. Titanium foil 12 is electrically connected to an electrical power source using any suitable conductor, such as a wire or a flexible circuit. The electrical energy may be intermittently or continuously supplied to titanium foil 12, depending upon whether a deicing or anti-icing function is desired.

In the embodiment of FIG. 1, a thickness of titanium foil 12 is approximately 0.001" (1.0 mil). A suitable range for the thickness of foil 12 is approximately 0.0005" to 0.005" (0.5 to 5 mils), while a preferred range is approximately 0.001" to 0.003". A thin foil is preferred due to limited space inside the component. Other factors which may limit the thickness of the foil include weight restrictions of the component and an overall efficiency of the foil as a heater.

In the embodiment of FIG. 1, first and second film adhesives 14 and 16 are fiberglass supported bismaleimide (BMI) film adhesives. Other materials that may be used in adhesives 14 and 16 include, but are not limited to, polyimide, polyester, phenolic, cyanate ester, epoxy and phthalonitrile.

First and second film adhesives 14 and 16 may be used to attach titanium foil 12 to at least one reinforcement layer to form a heater assembly, as discussed in more detail below in reference to FIG. 3.

Figure 2:
FIG. 2 is a schematic of an alternative embodiment of a film assembly, which includes a thin titanium foil.

FIG. 2 is a schematic of an alternative embodiment of film assembly 20, which similar to film assembly 10, includes titanium foil 22, first film adhesive 24, and second film adhesive 26. Film assembly 20 also includes support layer 28.

In the embodiment of FIG. 2, titanium foil 22 may be a "configured" foil, meaning that foil 22 is etched into a shape to form a discontinuous sheet, prior to attaching foil 22 to adhesive layers 24 and 26. Foil 22 may be configured using a photoetching process, or a chemical milling process, both of which are commonly known in the field. Titanium foil 22 may be any type of shape. The shape typically depends upon the type of component and the area of the component that requires deicing and/or anti-icing, since the shape of foil 22 controls the electrical properties and heat distribution from foil 22.

In many cases, configured foils are more delicate and fragile, compared to non-configured foils, and may require a support layer, such as support layer 28, which may be attached to foil 22 prior to the etching process used to configure foil 22. Support layer 28 may include, but is not limited to, a fabric layer, such as fiberglass or other suitable ceramic fiber fabrics, or a plastic film, such as polyimide. As shown in FIG. 2, support layer 28 may remain attached to foil 22 after the etching process such that support layer 28 resides between foil 22 and film adhesive 26. Alternatively, a temporary support layer may be removed from foil 22 prior to attaching film adhesive 26 to foil 22.

Figure 3:
FIG. 3 is a schematic of a heater assembly, which includes the film assembly of FIG. 2 surrounded by first and second reinforcement layers.

FIG. 3 is a schematic of heater assembly 30, which includes film assembly 10 of FIG. 1, first reinforcement layer 32 and second reinforcement layer 34. Heater assembly 30 is representative of a heater assembly suitable for deicing an engine or airframe component and/or preventing ice from forming on the component.

First and second reinforcement layers 32 and 34 act as electrically insulating layers for foil 12, and may be formed from any material suitable to electrically insulate titanium foil 12, including, but not limited to, any fiber reinforced structure, such as epoxy, bisamelimide, polyimide, or other suitable organic or ceramic matrices. In embodiments, first and second reinforcement layers 32 and 34 may be made of ceramic fabric. As an alternative to fabric, reinforcement layers 32 and 34 may include, but are not limited to, unidirectional tape, discontinuous mat, and polymeric film. An example of a suitable polymeric film may include, but is not limited to, polyimide.

First film adhesive 14 is used to attach foil 12 to first reinforcement layer 32, and second film adhesive 16 is used to attach foil 12 to second reinforcement layer 34. In embodiments, film adhesives 14 and 16 may be electrically insulating in addition to or as an alternative to the insulating properties of reinforcement layers 32 and 34.

In alternative embodiments, heater assembly 30 may not include film adhesives 14 and 16, and a resin may instead be injected into heater assembly 30 to bond foil 12 to reinforcement layers 32 and 34. After injecting the resin into heater assembly 30, the resin may be cured so that heater assembly 30 becomes a hardened structure. Suitable resins for heater assembly 30 include, but are not limited to, epoxy, bismaleimide (BMI) or polyimide.

Although only one reinforcement layer is shown in FIG. 3 on each side of foil assembly 10, it is recognized that heater assembly 30 may include additional reinforcement layers surrounding titanium foil 12.

Figure 4:
FIG. 4 is a schematic of a composite, which includes the heater assembly of FIG. 3 inserted among a plurality of fabric layers.

FIG. 4 is a schematic of composite 40 which includes heater assembly 30 of FIG. 3, embedded among ceramic fabric layers 42 and carbon fabric layers 44. Composite 40 may be the engine or airframe component itself, or composite 40 may be a sub-assembly which is attached to another assembly to form the component.

In the embodiment of FIG. 4, composite 40 includes four layers of ceramic fabric 42 and two layers of carbon fabric 44 surrounding each side of heater assembly 30. It is recognized that composite 40 may include any number of layers. Composite 40 is not limited to ceramic and carbon, and may be formed from any fiber reinforced structure, which may include, but is not limited to, epoxy, bisamelimide, polyimide or other suitable organic or ceramic matrices. Also, it is not required that heater assembly 30 be a center layer within composite 40.

Similar to heater assembly 30, composite 40 is commonly injected with a resin and heated to a high temperature such that the resin cures and forms a hardened structure. In embodiments, heater assembly 30 may be inserted among the other layers 42 and 44 prior to injecting resin into heater assembly 30, and the resin may be inserted into composite 40 such that heater assembly 30 and surrounding layers 42 and 44 form a hardened composite structure. Types of resins that may be used include, but are not limited to, epoxy, bismaleimide (BMI) or polyimide.

As stated above, composite 40 is not limited to the number of fabric layers shown in FIG. 4, and composite 40 may include fewer layers around heater assembly 30.

Titanium foil 12 of heater assembly 30 is configured as a structural heater that is able to carry a structural load within heater assembly 30, which improves performance of heater assembly 30 when it is embedded inside an engine or airframe component, similar to composite 40 of FIG. 4 which may form the component. The ability of titanium foil 12 to function as a structural heater within a component is based on factors such as a stiffness of foil 12, a strength of a bond between foil 12 and a surrounding layer, and the durability of the bond over an operational life of the component.

Titanium foil 12 is inherently stiff and has a stiffness or modulus that is comparable to other layers within composite 30. Thus, titanium foil 12 may be able to transfer a structural load to surrounding layers within composite 40, while simultaneously functioning as a heater within the composite. However, if foil 12 is not sufficiently bonded to the surrounding layers, the ability of foil 12 to transfer a structural load may be inhibited. Thus, it may be important to maximize the strength of the bond between foil 12 and the surrounding layers. It also may be important that the bond attaching foil 12 to the surrounding layers is stable enough to withstand operating conditions throughout a life of the component that heater assembly 30 is embedded inside. As described above, an adhesive film (like adhesive films 14 and 16 of FIG. 1 and adhesive films 24 and 26 of FIG. 2) or a resin may be used for bonding foil 12 to surrounding layers.

Other resistive metals, such as copper alloys and nickel alloys, may be used as a heater element; however, titanium or titanium alloys, by comparison, show improved performance as a structural heater. The thin titanium foils of the present invention may weigh less than other resistive metals. Moreover, the titanium foils are able to bond strongly with adhesives suitable for use in turbine engine components that may be exposed to extremely high operating temperatures. For example, preferred adhesives used in these applications include, but are not limited to, bismaleimide and polyimide, as disclosed above.

The strength and the durability of the bond are determined in part by a surface treatment which may be used on titanium foil 12 to remove mechanically weak oxides and other contaminants that may inhibit bonding of titanium foil 12 with the adhesive. A preferred method for surface treating a thin titanium foil is disclosed in the co-pending application entitled SURFACE TREATMENT FOR A THIN TITANIUM FOIL, which is incorporated herein by reference.

In order to determine a preferred surface treatment method, various samples of composites, similar to composite 40 of FIG. 4, were assembled in which each composite included a heater assembly similar to heater assembly 30 of FIG. 3. Each of the composites had a thin titanium foil which underwent a different surface treatment process. Table 1 below shows the specific surface treatment of each titanium foil for samples 1-6. A baseline sample composite was also prepared which did not contain a titanium foil.

TABLE 1

| Sample # | Pre-clean 1 | Pre-clean 2 | Etch | Desmut | Post-clean | Dry | Primer |
| --- | --- | --- | --- | --- | --- | --- | --- |
| Baseline (no Ti foil) | N/A | N/A | N/A | N/A | N/A | N/A | N/A |
| 1 | Vapor Blast | Light Alkaline | Turco etch | Nitric Acid | Ultrasonic water | Yes | Yes |
| 2 | Nitric Acid/ HF Acid | Light Alkaline | Turco etch | Nitric Acid | Ultrasonic water | Yes | Yes |
| 3 | Nitric Acid/ HF Acid | Light Alkaline | Turco etch | None | Ultrasonic water | Yes | Yes |
| 4 | Nitric Acid/ HF Acid | None | None | None | Ultrasonic water | Yes | Yes |
| 5 | Nitric Acid/ HF Acid | Light Alkaline | Turco etch | None | Ultrasonic water | Yes | No |
| 6 | Vapor Blast | Light Alkaline | None | None | Acetone Wipe | Yes | No |

The initial steps in the surface treatment process are two cleaning processes (pre-clean 1 and pre-clean 2). In pre-clean 1, the titanium foil samples were either vapor blasted or soaked in a nitric acid/hydrofluoric acid solution. Next, in pre-clean 2, all of the samples, except for sample 4, were treated with a light alkaline cleaner to neutralize the acid from pre-clean 1 and clean the surface of the foil. In step 3, the foil samples, except for samples 4 and 6, were etched using a strong alkaline etchant, such as, but not limited to, Turco 5578-L. The etching process in step 3 is used to prepare the foil surface for bonding by removing oils and loose oxides on the surface; it is not used to change the shape of the foil. Etching commonly causes a black residue, or smut, to form on parts of the foil surface. Thus, samples 1 and 2 were treated with nitric acid to desmut the foil. All the foil samples were then cleaned, using either an ultrasonic water treatment (samples 1-5) or an acetone wipe, and then dried. A primer was then applied to samples 1-4 as a thin coating to stabilize the surface of the foil and preserve the surface for adhesive bonding. The primer may be any type of resin that is compatible with the composite, such as, but not limited to, epoxy, bismaleimide, polyimide, polyester, phenolic, cyanate ester, and phthalonitrile.

Each of the composites in Table 1 underwent testing to determine its interlaminar shear strength. Prior to testing, a specimen from each composite was exposed to conditions 1-4 outlined in Table 2 below. The intent of the conditions was to imitate various environments that a composite may likely be exposed to, including atmospheric moisture.

TABLE 2

| Condition # | Details of particular condition |
| --- | --- |
| 1 | Dry laminate for a minimum of 48 hours at 250° F. |
| 2 | Same as condition 1 with an additional 500 hours of isothermal conditioning at 350° F. |
| 3 | Condition laminate at 140° F. and 95% relative humidity for 30 days |
| 4 | Condition laminate for 500 hours at 350° F. followed by conditioning at 140° F. and 95% relative humidity for 30 days |

For each of the composite samples in Table 1 above, twelve test specimens (three samples for each condition in Table 2) were prepared. Each specimen was cut to form a piece having a width of ½" which then underwent a four point short beam shear (SBS) test using a span to depth ratio of 4:1 and a crosshead speed of 0.05 inches per minute. The test was used to determine the interlaminar shear strength of each specimen.

FIG. 4 is a plot of short beam shear (SBS) for the four conditions for each of the composite samples. Each SBS value shown in FIG. 4 is an average value of the three samples for that condition. Higher values are preferred since the SBS value equates to the strength of the bonds within the composite. A strong and durable bond between the titanium foil and the surrounding layers within the composite makes it feasible for the titanium foil to carry and transfer a structural load within the composite.

Figure 5:
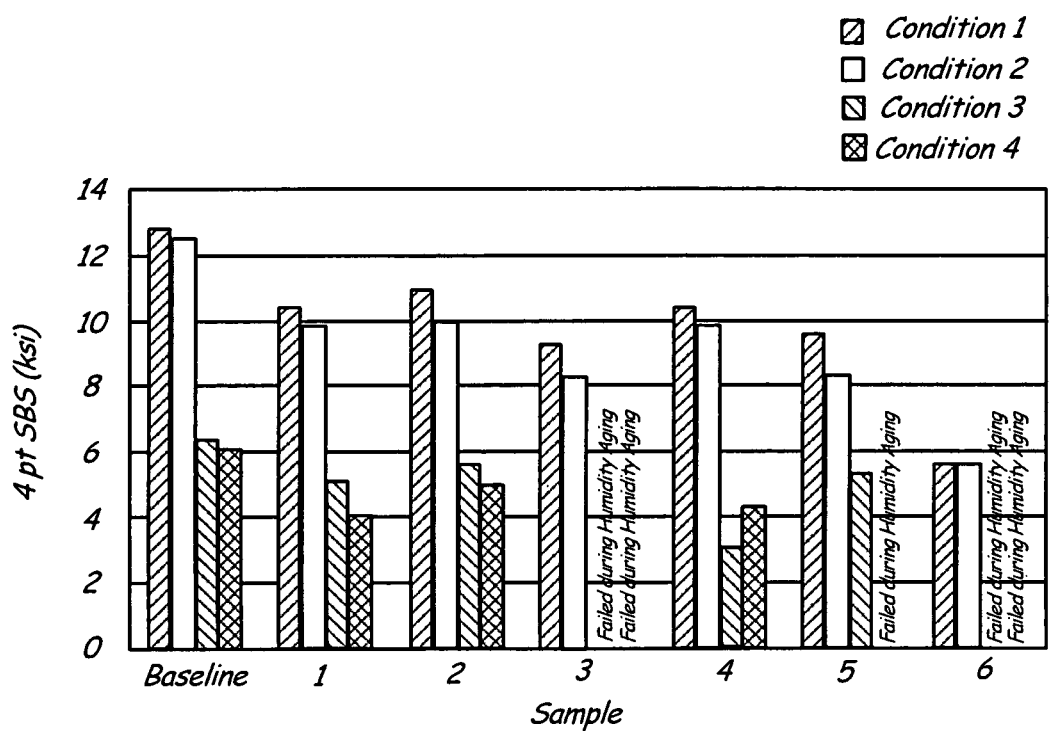
FIG. 5 is a plot of shear bond strength for various composite samples in which the titanium foil was prepared using different methods of surface treating the foil.

As shown in FIG. 5, the baseline sample exhibited the highest values under all conditions since the baseline composite did not contain a titanium foil, and thus surface preparation of the foil to ensure adequate bonding was not an issue. Sample 1 showed a decrease in SBS values for all four conditions, as compared to the baseline sample. The surface treatment used on the titanium foil in sample 1 includes vapor blasting as an initial cleaning step; as such, this surface treatment may not be used on a configured foil without causing damage to the foil. Sample 2 had higher SBS values, as compared to sample 1, for all four conditions. In sample 2, the initial cleaning step was to soak the foil in a nitric acid/hydrofluoric acid solution. Sample 2 also exhibited higher SBS values under all conditions, as compared to samples 3-6. The surface treatment used on sample 2 (see Table 1 above) is a preferred surface treatment process in order to achieve a high strength, durable bond within the composite.

In the case of sample 3, the specimens for conditions 3 and 4 disbanded during humidity aging. Sample 3 exhibits the importance of the nitric acid desmut in order to remove the residue left on the foil as a result of etching. Conditions 3 and 4 of sample 6 also fell apart during humidity aging, as did condition 4 of sample 5. Failure during humidity aging is significant since conditions 3 and 4 are used as a predictor of environmental durability.

In sample 4, the surface preparation of the foil did not include the steps of alkaline cleaning, etching and desmutting. As shown in FIG. 5, sample 4 exhibited a reduction in SBS values for conditions 1-4, as compared to sample 2. However, for conditions 1, 2 and 4, the difference in SBS values between samples 2 and 4 was minimal. Moreover, in sample 4, neither condition 3 nor condition 4 failed during humidity aging, in contrast to samples 3, 5 and 6. The surface treatment used on sample 4 (see Table 1 above) is an alternative embodiment of the present invention.

Sample 5 exhibited a reduction in SBS values across conditions 1-2 and failed in humidity aging under condition 4. The results from sample 5 illustrate the importance of applying a primer to the foil in order to produce an adequate bond within the composite. Finally, sample 6 exhibited low SBS values for conditions 1 and 2, and conditions 3 and 4 fell apart during humidity aging. Sample 6 illustrates that vapor blasting and an alkaline clean, in the absence of an etching process, does not provide a bond with adequate durability. Based on the test results illustrated in FIG. 5, the surface treatments used for samples 2 and 4 provide the best results in terms of preparing the surface of a titanium foil to promote strong adhesive bonding.

After undergoing shear strength testing, the failed test specimens were evaluated to determine whether the failure was adhesive or cohesive. Adhesive failure occurs when the failure mode is at the adhesive to foil interface. Cohesive failure refers to failure within the adhesive, and it is the desired failure mode.

TABLE 3

| | Failure Mode | | | |
|---|---|---|---|---|
| Sample # | Condition 1 | Condition 2 | Condition 3 | Condition 4 |
| Baseline | Cohesive | Cohesive | Cohesive | Cohesive |
| 1 | Cohesive | Cohesive | Adhesive | Adhesive |
| 2 | Cohesive | Cohesive | Adhesive | Adhesive |
| 3 | Adhesive | Adhesive | Adhesive | Adhesive |
| 4 | Cohesive | Cohesive | Adhesive | Adhesive |
| 5 | Adhesive | Adhesive | Adhesive | Adhesive |
| 6 | Adhesive | Adhesive | Adhesive | Adhesive |

As illustrated in Table 3, the baseline sample was the only sample which did not exhibit adhesive failure for conditions 3 and 4, with the reason being that the baseline sample did not contain any titanium. Samples 1, 2 and 4 had cohesive failure in conditions 1 and 2, whereas samples 3, 5 and 6 had adhesive failure under all conditions. As stated above, the surface treatment used on the foil in sample 1 may not be used on a configured foil without causing damage to the foil. Thus, the data in Table 3 validates the results from FIG. 5. The surface treatment used on sample 2 provides the best results for preparing the titanium foil for adhesive bonding within the composite such that the titanium foil is able to function as a structural heater element when embedded inside a component. Alternatively, the surface treatment used on sample 4 provides similar results to sample 2 in adequately preparing the surface of the foil for adhesive bonding.

Figure 6:
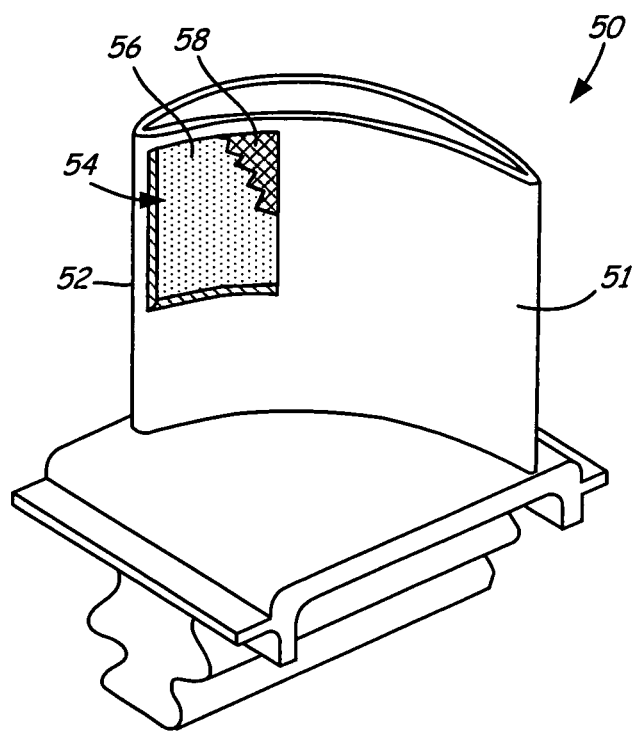
FIG. 6 is a perspective view of an airfoil, which is cut-away to show a heater assembly that is embedded along a leading edge of the airfoil.

FIG. 6 illustrates an embodiment of a turbine engine component that includes an embedded heater assembly having a titanium foil. FIG. 6 is a perspective view of airfoil 50, where a portion of body 51 of airfoil 50 has been cut-away along leading edge 52 to expose heater assembly 54. Body 51 of airfoil 50 is a composite structure and heater assembly 54 is embedded in body 51 as part of that composite. Heater assembly 54 is similar to heater assembly 30 of FIG. 3 and includes reinforcement layer 56 and titanium foil 58. As discussed above in reference to FIG. 3, heater assembly 54 may include additional layers that surround foil 58. In the embodiment of heater assembly 54 of FIG. 6, reinforcement layer 56 is positioned between an exterior surface of body 51 and foil 58, and layer 56 acts as an insulating layer to foil 58. Reinforcement layer 56 and foil 58 may be attached using an adhesive as described above. The high strength of the bond between layer 56 and foil 58 allows foil 58 to function as a structural heater element.

Airfoil 50 is a gas turbine engine component, and may be, for example, an airfoil in a compressor. If the gas turbine engine is used in an aircraft, moisture may accumulate on leading edge 52 of airfoil 50, and the moisture may turn into ice as the aircraft reaches higher elevations. In addition, impingement of super-cooled atmospheric moisture during flight may result in ice accumulation on airfoil 50 and other turbine engine or airframe components. Heater assembly 54 may be embedded in leading edge 52 in order to prevent the accumulation of ice (i.e. anti-icing) along leading edge 52 or to remove ice (i.e. deicing) from leading edge 52. Titanium foil 58 receives electrical energy from an external power source (not shown) and converts electrical power into thermal energy to heat leading edge 52 of airfoil 50 and melt ice or prevent ice from forming on edge 52.

Embodiments of the present invention relate to a heater assembly configured to be embedded inside a component. The heater assembly includes a titanium foil, which may be configured or unconfigured, that is capable of functioning as a structural heater element. The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. An electrothermal heater assembly configured to be embedded inside a component for anti-icing and/or deicing the component, the heater assembly comprising:
   a titanium foil configured for use as a heating element;
   at least one reinforcement layer adjacent the titanium foil; and
   an adhesive configured to bond the titanium foil to the at least one reinforcement layer, wherein the heater assembly is configured such that the titanium foil carries a structural load from and transfers a structural load to the at least one reinforcement layer by being subjected to a surface treatment prior to bonding the titanium foil to the at least one reinforcement layer, and the surface treatment removes mechanically weak oxides and oils on a surface of the titanium foil to facilitate stable bonding;

wherein the surface treatment comprises soaking the titanium foil in a nitric acid/hydrofluoric acid solution, treating the titanium foil with a light alkaline cleaner to neutralize the nitric/hydrofluoric acid, etching the titanium foil, cleaning the titanium foil with either ultrasonic water treatment or an acetone wipe, and coating the titanium foil with a resin primer.

2. The heater assembly of claim 1 wherein the titanium foil is selected from a group consisting of a commercially pure titanium and a titanium alloy.

3. The heater assembly of claim 1 wherein the titanium foil has a thickness ranging from about 0.5 mils to about 5 mils.

4. The heater assembly of claim 3 wherein the thickness of the titanium foil is about 1 mil.

5. The heater assembly of claim 1 wherein the titanium foil is configured into a shape suitable for using the foil as a heating element.

6. The heater assembly of claim 5 wherein the titanium foil includes a support layer.

7. The heater assembly of claim 1 wherein the adhesive is an adhesive film insertable between the titanium foil and the at least one reinforcement layer.

8. The heater assembly of claim 1 wherein the adhesive is a resin applied to the at least one reinforcement layer and the titanium foil.

9. The heater assembly of claim 1 wherein the adhesive is electrically insulating.

10. The heater assembly of claim 1 wherein the at least one reinforcement layer is selected from a group consisting of fabric, unidirectional tape, discontinuous mat, and polymeric film.

11. The heater assembly of claim 10 wherein the fabric includes fibers selected from a group consisting of carbon, glass, polymer and ceramic.

12. The heater assembly of claim 10 wherein the polymeric film includes polyimide.

13. The heater assembly of claim 1 wherein the at least one reinforcement layer is electrically insulating.

14. A gas turbine engine component comprising:
a body; and
a heater assembly embedded inside the body and configured for delivering heat to the body, the heater assembly comprising:
a titanium foil for use as a heating element;
a reinforcement layer positioned between the body and the titanium foil; and
an adhesive for adhering the titanium foil to the reinforcement layer, wherein the titanium foil is configured to carry and transfer a structural load within the component by being subjected to a surface treatment prior to bonding the titanium foil to the reinforcement layer, and the surface treatment removes mechanically weak oxides and oils on a surface of the titanium foil to facilitate stable bonding;
wherein the surface treatment comprises soaking the titanium foil in a nitric acid/hydrofluoric acid solution, treating the titanium foil with a light alkaline cleaner to neutralize the nitric/hydrofluoric acid, etching the titanium foil, cleaning the titanium foil with either ultrasonic water treatment or an acetone wipe, and coating the titanium foil with a resin primer.

15. The gas turbine engine component of claim 14 wherein the titanium foil has a thickness between approximately 0.5 mils and approximately 5.0 mils.

16. The gas turbine engine component of claim 15 wherein the thickness of the titanium foil is between approximately 1.0 mil and approximately 3.0 mils.

17. The gas turbine engine component of claim 14 wherein the reinforcement layer is selected from a group consisting of fabric, unidirectional tape, discontinuous mat, and polymeric film.

18. The gas turbine engine component of claim 17 wherein the fabric is comprised of fibers selected from a group consisting of carbon, glass, polymer and ceramic.

19. The gas turbine engine component of claim 14 wherein the reinforcement layer is electrically non-conductive and insulates the titanium foil.

20. The gas turbine engine component of claim 14 wherein the adhesive is selected from a group consisting of bismaleimide, epoxy, polyimide, polyester, phenolic, cyanate ester, and phthalonitrile.

21. The gas turbine engine component of claim 14 wherein the titanium foil is etched to form a shape that is suitable for optimizing a heat distribution from the foil to the body.

22. A method of forming a heater assembly having a metallic heater element capable of carrying a structural load within a turbine engine component, the method comprising:
preparing a titanium foil for use as a heater element by performing a surface treatment on the titanium foil which removes mechanically weak oxides and oils on a surface of the titanium foil such that the titanium foil is capable of forming a strong bond with at least one reinforcement layer, wherein the surface treatment comprises soaking the titanium foil in a nitric acid/hydrofluoric acid solution, treating the titanium foil with a light alkaline cleaner to neutralize the nitric/hydrofluoric acid, etching the titanium foil, cleaning the titanium foil with either ultrasonic water treatment or an acetone wipe, and coating the titanium foil with a resin primer;
bonding the titanium foil to the at least one reinforcement layer to form the heater assembly capable of carrying a structural load from and transferring load to the at least one reinforcement layer; and
embedding the heater assembly inside the component.

23. The method of claim 22 wherein preparing the titanium foil includes etching the foil to form a shape suitable for optimizing use of the foil as a heater element.

24. The method of claim 22 wherein bonding the titanium foil to the at least one reinforcement layer is performed by a film adhesive placed between the foil and the at least one reinforcement layer.

25. The method of claim 22 wherein bonding the titanium foil to the at least one reinforcement layer is performed by a resin that is injected into the titanium foil and the at least one reinforcement layer.

* * * * *

UNITED STATES PATENT AND TRADEMARK OFFICE
CERTIFICATE OF CORRECTION

| | | |
|---|---|---|
| PATENT NO. | : 9,133,714 B2 | Page 1 of 1 |
| APPLICATION NO. | : 11/591327 | |
| DATED | : September 15, 2015 | |
| INVENTOR(S) | : John H. Vontell | |

It is certified that error appears in the above-identified patent and that said Letters Patent is hereby corrected as shown below:

IN THE SPECIFICATION

Col. 7, Line 13
  Delete "disbanded"
  Insert --disbonded--

Signed and Sealed this
First Day of March, 2016

Michelle K. Lee
*Director of the United States Patent and Trademark Office*